(12) United States Patent
Nakai et al.

(10) Patent No.: US 10,041,834 B2
(45) Date of Patent: Aug. 7, 2018

(54) COLOR MEASURING APPARATUS, IMAGE FORMING APPARATUS AND COLOR MEASURING METHOD

(71) Applicant: CANON KABUSHIKI KAISHA, Tokyo (JP)

(72) Inventors: Tomoaki Nakai, Numazu (JP); Hitoshi Furukawa, Suntou-gun (JP); Akihiko Uchiyama, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 196 days.

(21) Appl. No.: 14/820,548

(22) Filed: Aug. 6, 2015

(65) Prior Publication Data
US 2016/0041034 A1    Feb. 11, 2016

(30) Foreign Application Priority Data

Aug. 11, 2014   (JP) .................................. 2014-163743

(51) Int. Cl.
| | |
|---|---|
| *G01J 3/40* | (2006.01) |
| *G01J 3/46* | (2006.01) |
| *G01J 3/28* | (2006.01) |
| *G01J 3/02* | (2006.01) |

(Continued)

(52) U.S. Cl.
CPC ............... *G01J 3/40* (2013.01); *G01J 3/0205* (2013.01); *G01J 3/0216* (2013.01); *G01J 3/0256* (2013.01); *G01J 3/2823* (2013.01); *G01J 3/46* (2013.01); *G01J 3/501* (2013.01); *G01J 3/502* (2013.01); *H04N 1/6044* (2013.01)

(58) Field of Classification Search
CPC .. G01J 3/501; G01J 3/46; G01J 3/2823; G01J 3/0256; G01J 3/0216; G01J 3/502; G01J 3/0205; G01J 3/40
See application file for complete search history.

(56) References Cited

U.S. PATENT DOCUMENTS

| | | | |
|---|---|---|---|
| 6,449,045 B1 * | 9/2002 | Mestha ..................... | G01J 3/46 356/402 |
| 6,898,381 B2 | 5/2005 | Maebashi et al. | |
| 8,873,045 B2 | 10/2014 | Ebihara et al. | |

(Continued)

FOREIGN PATENT DOCUMENTS

| | | |
|---|---|---|
| JP | 2013-024600 A | 2/2013 |
| JP | 2013-040799 A | 2/2013 |
| JP | 2015-036669 A | 2/2015 |

*Primary Examiner* — Dominic J Bologna
(74) *Attorney, Agent, or Firm* — Fitzpatrick, Cella, Harper & Scinto (57) ABSTRACT

A color measurement device includes a light source for illuminating an object with light; a dispersing portion for spectrally dispersing light emitted and reflected by the object; a light receptor for receiving the light dispersed by the dispersing portion; and a controller for effecting color measurement based on a result of light reception of the light receptor from the object which is an image formed on a recording material; wherein the emitted light has a first intensity of light in a first wavelength range and a second intensity lower than the first intensity in a second wavelength range, and wherein the controller deduces a value relating to color measurement for the second wavelength range on the basis of a result of light reception of the light receptor for the first wavelength range.

25 Claims, 8 Drawing Sheets (51) Int. Cl.
*G01J 3/50* (2006.01)
*H04N 1/60* (2006.01)

(56) References Cited

U.S. PATENT DOCUMENTS

| | | | |
|---|---|---|---|
| 2006/0132777 A1* | 6/2006 | Hubble, III | G01J 3/10 356/402 |
| 2013/0016352 A1* | 1/2013 | Kita | G01J 3/501 356/402 |
| 2015/0049371 A1 | 2/2015 | Kamijo et al. | |

* cited by examiner

COLOR MEASURING APPARATUS, IMAGE FORMING APPARATUS AND COLOR MEASURING METHOD

FIELD OF THE INVENTION AND RELATED ART

The present invention relates to a color measuring apparatus, an image forming apparatus, and a color measuring method.

In recent years, it has been desired to improve a color image forming apparatus such as a color printer, a color copying machine, etc., in image quality. The stability of an image forming apparatus, in particular, in terms of color and gradation, has significant effects upon image quality. However, a color image forming apparatus, for example, a color printer, is some times changed in the chromaticity of images it outputs, by environmental changes, such as the changes in temperature and humidity, and/or being in service for a long period of time. Thus, in order to enable a color image forming apparatus to remain stable in chromaticity, it is necessary that the chromaticity of the images which a color image forming apparatus outputs is detected by a color measuring sensor, and the detected chromaticity is fed back (reflected upon) to the image processing condition of the image forming apparatus.

One of the devices which have been used to measure (meter) a print or an object in chromaticity is a colorimeter. Generally speaking, one of the most widely used colorimeter is of the so-called filter type, which illuminates an object to be measured in color, with white light, catches the white light reflected by the object, with a sensor, through a R (red), G (green), or B (blue) color filter, to measure each color component in intensity. There is also a spectral colorimeter which diffuses the reflected light with use of a diffraction grating element, a prism, or the like, and then, detects the intensity of the reflected light, for each wavelength, with the use of a line sensor. In the case of this type of colorimeter, the spectral reflectance of an object is obtained by computation which is to be made in consideration of the detected wavelength distribution of the diffused light, wavelength distribution of the light source, spectroscopic sensitivity of the sensor, and so on. As the light source of the spectral colorimeter, a white LED has come to be widely used because it is advantageous in that it is low in cost, does not take up a large space, and is durable. For example, there is disclosed in Japanese Laid-open Patent Application No. 2013-024600, a spectral colorimeter, which can highly accurately obtain the chromaticity of an object, without directly measuring the stray light components of the reflected light.

However, a spectral colorimeter which employs a conventional white LED suffers from the following problem. That is, in terms of wavelength, visible rays which are necessary to measure the color of an object is desired to be in a range of 400 nm to 700 nm, preferably, 380 nm to 730 nm, in wavelength. Thus, it is necessary to obtain the spectral reflectance of the object. However, some inexpensive white LEDs cannot generate the shorter wavelength end portion of the visible ray spectrum. Thus, when such a white LED is used as the light source for a colorimeter, it reduces the colorimeter in accuracy.

The present invention was made in consideration of the above-described issue. Thus, its primary object is to improve a colorimeter in accuracy.

SUMMARY OF THE INVENTION

According to an aspect of the present invention, there is provided a color measurement device comprising a light emitting portion configured to illuminate an object with light; a dispersing portion configured to spectrally disperse light emitted and reflected by the object; a light receiving portion including a plurality of elements configured to receive the light spectrally dispersed by said dispersing portion; and a controller configured to effect color measurement on the basis of a result of light reception of said light receiving portion from the object which is an image formed on a recording material; wherein the light emitted by said light emitting portion has a first intensity of light in a first wavelength range and a second intensity lower than the first intensity in a second wavelength range, and wherein said controller deduces a value relating to color measurement for the second wavelength range on the basis of a result of light reception of said light receiving portion for the first wavelength range.

According to another aspect of the present invention, there is provided an image forming apparatus comprising the color measurement device.

Further features of the present invention will become apparent from the following description of exemplary embodiments with reference to the attached drawings.

BRIEF DESCRIPTION OF THE DRAWINGS

Parts (a)-(e) of FIG. 2 is a schematic drawing of the spectral colorimeter in the first and second embodiments, and shows the general structure of the device.

Parts (a)-(c) of FIG. 3 are a perspective views of the housing of the spectral colorimeter, an exploded perspective view of the housing, and a plan view of the line sensor, respectively, in the first and second embodiments.

DESCRIPTION OF THE EMBODIMENTS

Hereinafter, a few of the preferred embodiments of the present invention are described in detail with reference to the appended drawings. The following embodiments of the present invention are not intended to limit the present invention in scope in terms of the measurement, material, and shape of the structural components of a combination of an image forming apparatus and a colorimeter, and the positional relationship among the components. That is, the present invention is to be modified as necessary according to the configuration of an apparatus to which the present invention is applied, and also, the condition under which the apparatus is operated. The present invention relates to such an image forming apparatus as an inkjet copying machine or printer, an electrophotographic copying machine or printer, etc. In particular, it relates to a colorimeter for measuring the color of the image of the colorimetric referential patch, outputted by an image forming apparatus.

Embodiment 1

[Colorimeter]

Figure 1:
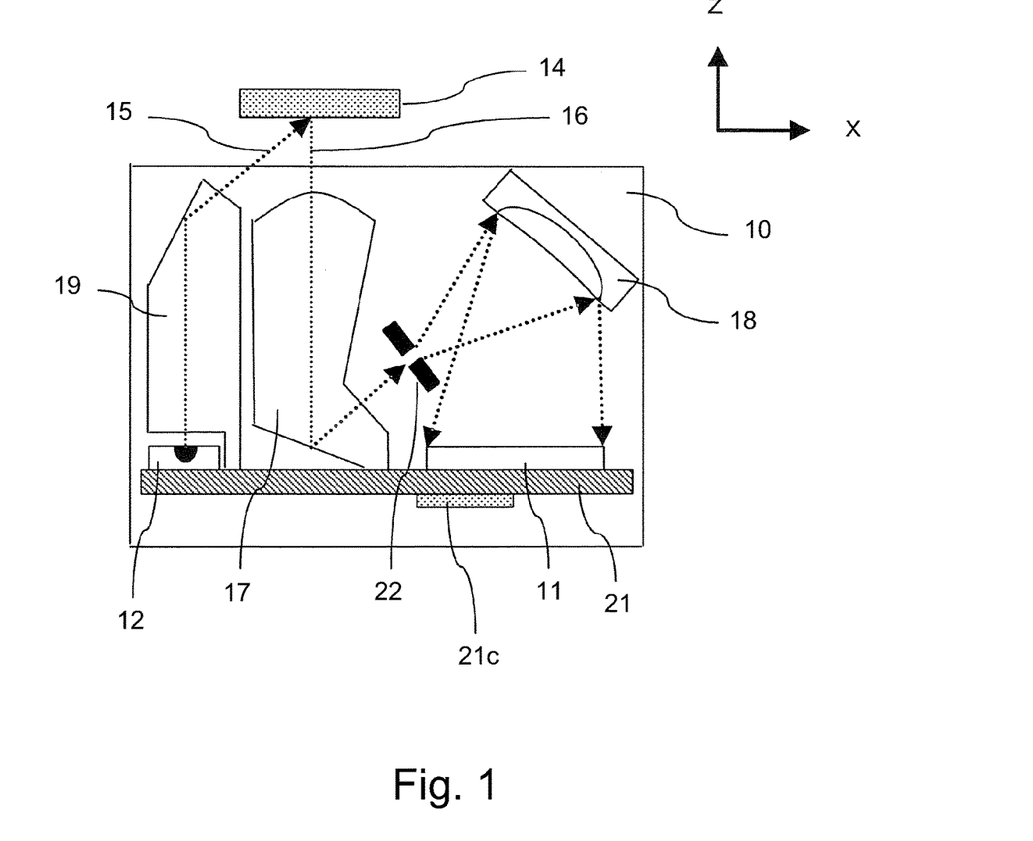
FIG. 1 is a schematic drawing of the spectral colorimeter in the first and second embodiments of the present invention, and shows the general structure of the device.

FIG. 1 is a sectional view of the spectral colorimeter 10, as a color measuring apparatus, in the first embodiment of the present invention. It is for describing the general structure of the device 10. Hereafter, the lengthwise direction of the line sensor 11, which will be described later, is referred to as the axis X direction, and the direction which is parallel to the line which connects between the line sensor 11 and the color measurement object 14, the color of which is to be measured, and which will be described later, is referred to as the axis Z direction. Further, the direction which is parallel to both the axes X and Z will be referred to as the axis Y direction. FIG. 1 is a sectional view of the spectral colorimeter 10 at a plane perpendicular to the surface of the color measurement object 14, the color of which is to be metered, that is, a plane which is parallel to both the axes X and Z. The spectral colorimeter 10 in this embodiment has: a white light source 12 (which hereafter will be referred to simply as light source 12), the wavelength range of which includes the entirety of the wavelength range of visible light; and a condensing-guiding lens 19 (which hereafter will be referred to as exit light guide 19) on the illuminating side. Further, it has a condensing-guiding lens 17 (entrance light guide 17, hereafter), a slit 22, a diffraction grating 18 (diffraction grating having concave reflective surface), a line sensor 11 of the charge accumulation type, which has multiple cells (which hereafter will be referred to simply as line sensor 11). Here, the light source 12 is equivalent to a light emitting element. Further, the diffraction grating 18 is equivalent to a spectroscopic section or dispersing portion configured to spectrally disperse light. Moreover, the line sensor 11 is equivalent to a light receiving portion configured to receive and to sense light, and as described below such as in connection with part (c) of FIG. 3, line sensor 11 includes a plurality of light sensing elements.

As the material for the substrate 21, such material that is made by soaking a sheet of paper with epoxy resin and drying the soaked sheet of paper, and such material that is made by soaking a piece of cloth made by layering sheets of cloth made of glass fiber, with epoxy resin, are preferable. On the substrate 21, a computing section 21c, which controls the operation of the spectral colorimeter 10, is disposed. The computing section 21c has a circuit for controlling the light source 12 in the amount of light emission, and light emission timing, and a computation circuit for processing the signals outputted from the line sensor 11.

[Positioning and Structure of Each Component in Colorimeter]

Figure 2:
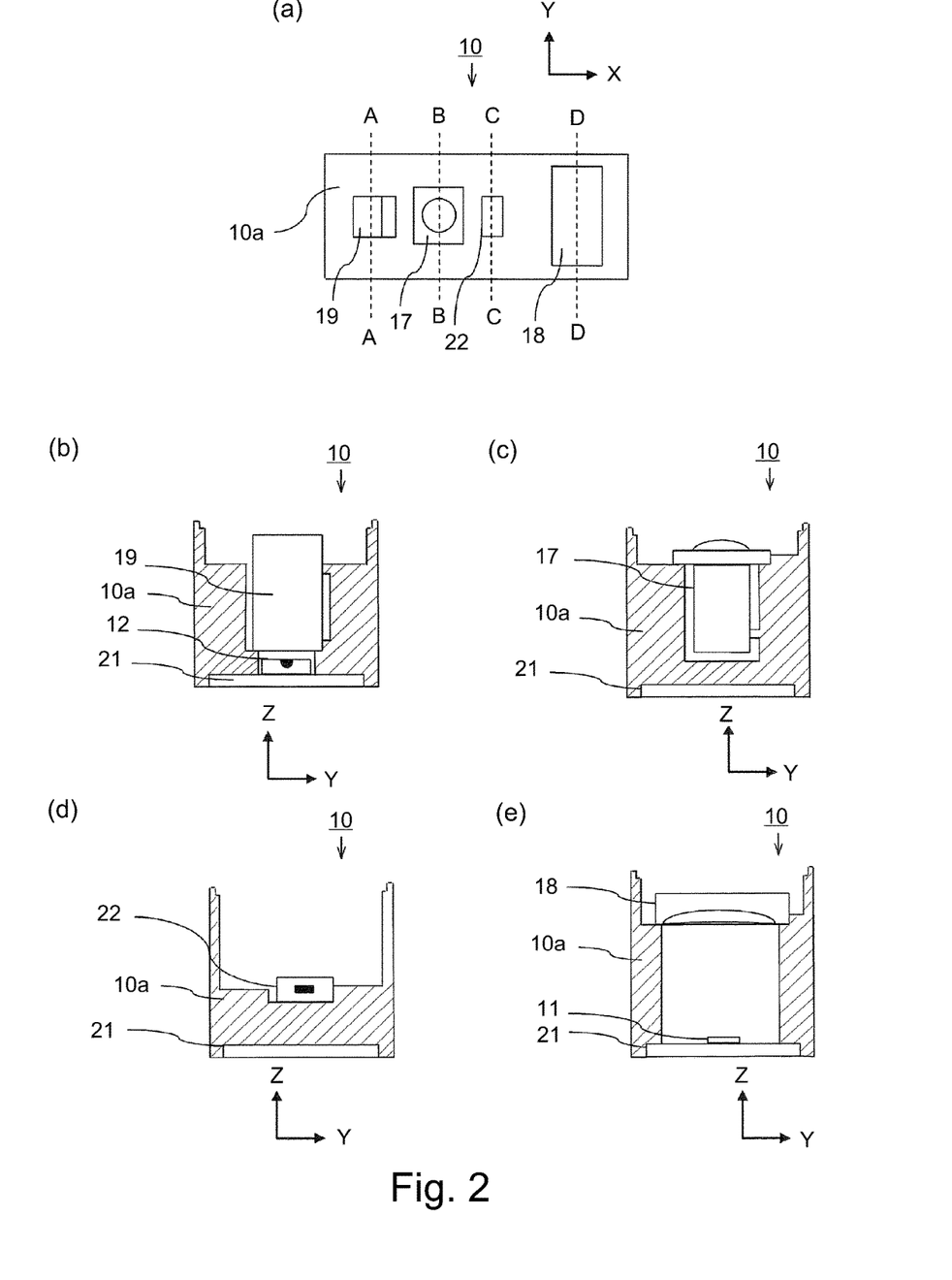
Figure 3:
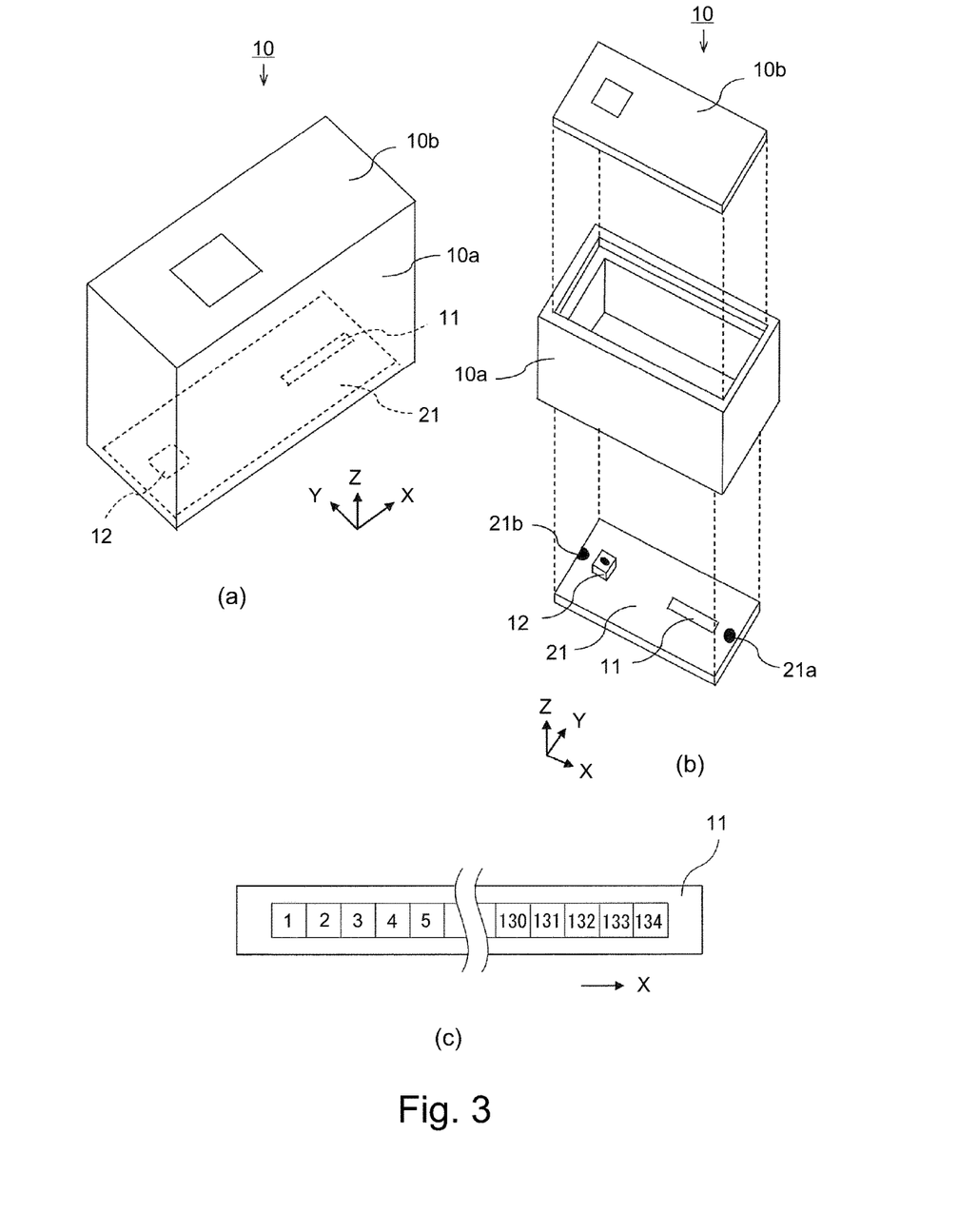

Next, the method for positioning each of the exit light guide 19, entrance light guide 17, slit 22, diffraction grating 18, and substrate 21 is described. Part (a) of FIG. 2 is a schematic drawing of the spectral colorimeter 10, as seen from the + direction of the axis Z, and part (b) of FIG. 2 is a sectional view of the spectral colorimeter 10 at a plane A-A in Figure (a). Part (c) of FIG. 2 is a sectional view of the spectral colorimeter 10 at a plane B-B in part (a) of FIG. 2, and part (d) of FIG. 2 is a sectional view of the spectral colorimeter 10 at a plane C-C in part (a) of FIG. 2. Part (e) of FIG. 2 is a sectional view of the spectral colorimeter 10 at a plane D-D in part (a) of FIG. 2. The spectral colorimeter 10 has a boxy frame 10a which serves as the housing portion of the spectral colorimeter 10, and a lid 10b (FIG. 3). The spectral colorimeter 10 has also the exit light guide 19, entrance light guide 17, slit 22, diffraction grating 18, and substrate 21, which are fixed to the boxy frame 10a, being thereby accurately positioned relative to each other.

Part (b) of FIG. 2 shows the relationship between the exit light guide 19 and boxy frame 10a. The exit light guide 19 is disposed in contact with the boxy frame 10a, being thereby positioned parallel to the axis Y. It is fixed to the boxy frame 10a with the use of adhesive which is curable with ultraviolet light. The entrance light guide 17 shown in part (c) of FIG. 2, slit 22 shown in part (d) of FIG. 2, and diffraction grating 18 shown in FIG. 3) are also disposed in contact with the boxy frame 10a, like the exit light guide 19, being thereby positioned parallel to the + direction of the axis Y. They also are fixed to the boxy frame 10a with the use of adhesive which is curable with ultraviolet light.

Next, the relationship among the boxy frame 10a, lid 10b, and substrate 21 is described in detail. FIG. 3 is a perspective view of the housing of the spectral colorimeter 10. Part (a) of FIG. 3 is a perspective view of the housing of the spectral colorimeter 10 after the assembly of the housing. Part (b) of FIG. 3 is a perspective view of the housing of the spectral colorimeter 10 before the assembly of the housing. By the way, the exit light guide 19, entrance light guide 17, slit 22, and diffraction grating 18 are not shown in FIG. 3. As will be evident from these drawings, the lid 10b and substrate 21 are attached to the boxy frame 10a, being thereby positioned parallel to the direction of the axis Z. The lid 10b is positioned by being fitted in the groove with which the boxy frame 10a is provided, and is adhered to the boxy frame 10a with the use of adhesive which is curable with ultraviolet ray. As for the substrate 21, it is provided with a referential hole 21a which serves as a reference for positioning the substrate 21 in terms of the directions parallel to the axes X and Y, respectively. As an unshown boss with which the boxy frame 10a is provided is fitted in the referential hole 21a, the substrate 21 is positioned relative to the boxy frame 10a in terms of the directions parallel to the axes X and Y. Further, the substrate 21 is provided with a recess 21b. As an unshown projection with which the boxy frame 10a is provided is fitted in the recess 21b, the substrate 21 is prevented from rotating about the axis Z. The substrate 21 is fixed to the boxy frame 10a with the use of adhesive which is curable with the ultraviolet light.

Here, a case in which the spectral colorimeter 10 is structured so that as the lid 10b and substrate 21 are attached to the boxy frame 10a, the surface of the lid 10b, by which the lid 10b is attached to the boxy frame 10a, and the surface of the substrate 21, by which the substrate 21 is attached to the boxy frame 10a, become parallel to each other, is described. However, the spectral colorimeter 10 may be structured so that the two surfaces become perpendicular to each other. In such a case, the spectral colorimeter 10 has only to be structured so that the light emitted by the light source 12 is made vertical to the surface of the lid 10b, by which the lid 10b is attached to the boxy frame 10a, by light guides to illuminate the color measurement object 14 which is to be measured in color.

[Colorimetry Principle]

Next, the colorimetry principle of the spectral colorimeter 10 is described. As light 15 is emitted from the light source 12 shown in FIG. 1, it is condensed and changed in direction by the exit light guide 19 so that it hits the surface of the color measurement object 14, that is, an object, the color of which is to be measured, at roughly 45°. The color of the color measurement object 14 is measured, with the object 14 being placed in a preset position (above spectral colorimeter 10 in FIG. 1) relative to the spectral colorimeter 10. As the light 15 hits the color measurement object 14 at roughly 45°, it is diffused (reflected) by the color measurement object 14 in such a manner that it reflects the properties of the color measurement object 14 in terms of light absorbency. A part of the diffused light 16 is taken in by the entrance light guide 17, becoming thereby parallel light. Then, it is changed in direction so that it hits the slit 22. Then, the diffused light 16 passes through the slit 22, and hits the diffraction grating 18, being reflected by the diffraction grating 18. As it is reflected by the diffraction grating 18, it is turned into a spectrum of visible light. The line sensor 11 is disposed so that it coincides with a line which is practically tangential to the Rowland circle (unshown) of the diffraction grating 18. It catches (detects) the visible ray spectrum generated by the diffraction grating 18, in such a manner that its light sensing cells catch specific sections of spectrum, one for one, in terms of wavelength.

Part (c) of FIG. 3 is a schematic drawing of the line sensor 11. As is evident from part (c) of FIG. 3, the line sensor 11 is made up of 134 light sensing cells which are necessary for the detection of the visible range of light which is roughly 350 nm to 750 nm in wavelength, in an increment of roughly 3 nm. The cells are aligned in the direction parallel to the axis X. Each cell of the line sensor 11 outputs voltaic signal (electrical signal) which is proportional to the intensity of the portion of the generated spectrum of light. Then, the outputted voltaic signal, which is an analog signal is converted into a digital signal by an AD converter (unshown), That is, the line sensor 11 converts the light reflected by the color measurement object 14 into digital signals which are proportional in strength to the corresponding portion of the light spectrum, with the use of its light sensing cells. The line sensor 11 in this embodiment is of the so-called charge accumulation type. Thus, each of the light sensing cells of the line sensor 11 outputs a voltaic signal, the strength of which is proportional to the cumulative strength of the diffused light received by each cell during a preset length of time. The length of time can be adjusted as necessary by the computing section 21c.

The digital signals outputted by these light sensing cells, one for one, are outputted from the line sensor 11 to the computing section 21c. The computing section 21c calculates spectral reflectance, which is related to colorimetry, for each section (unit of 10 nm) of the light spectrum which extends from 380 nm to 730 nm in terms of wavelength, and outputs from the spectral colorimeter 10. The method used by the computing section 21c to calculate the spectral reflectance is described later. Further, in this embodiment, in order to minimize the effects of the fluorescent whitening agent which the recording medium contains, a combination of a fluorescent member and a white LED, which is 455 nm in wavelength, is used as the light source 12.

[Spectrum of Light Source, in Terms of Wavelength]

Figure 4:
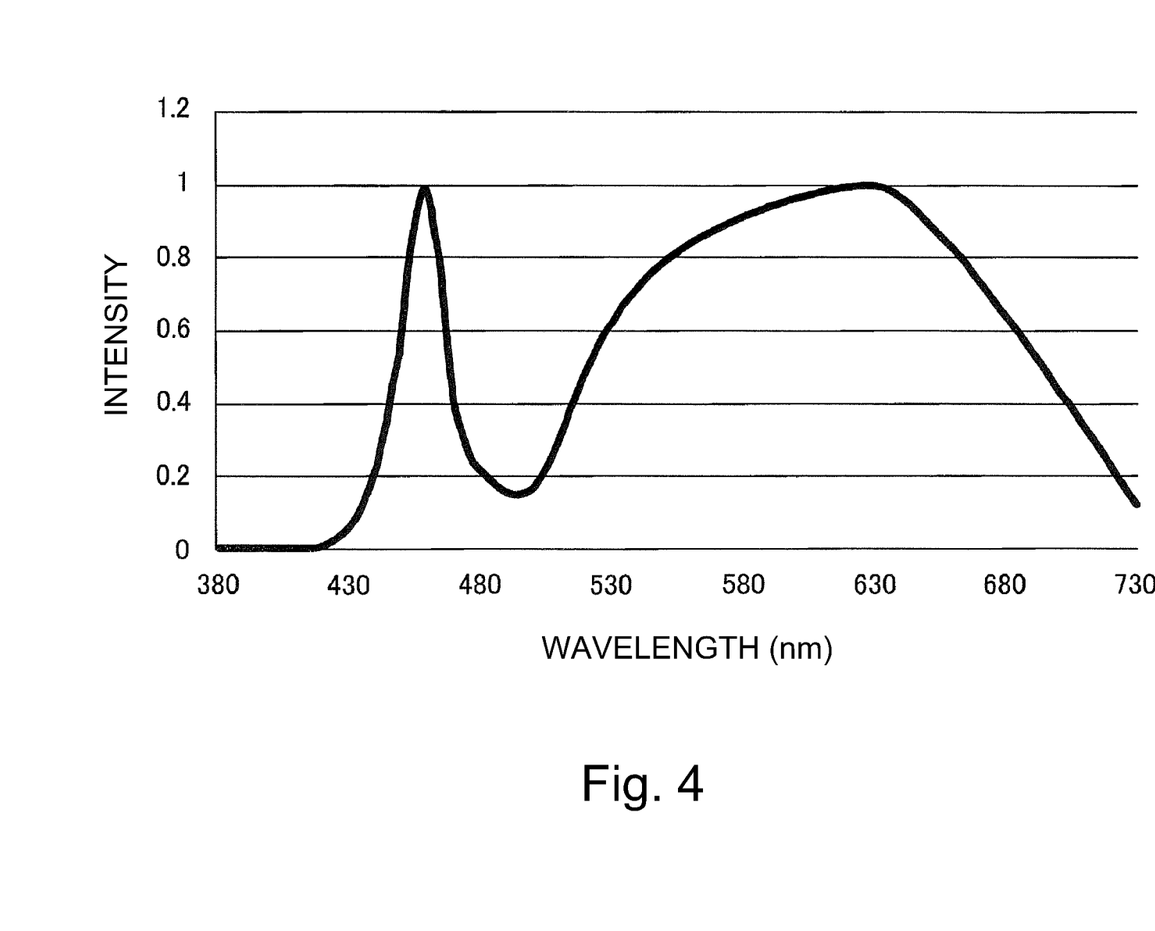
FIG. 4 is a drawing which shows the spectrum of the light emitted by the light source employed by the spectral colorimeter in the first and second embodiments.

FIG. 4 is the chromatic spectrum of the light emitted by the light source 12 (white color LED, in this embodiment) employed by the spectral colorimeter 10 in this embodiment. The horizontal axis of FIG. 4 represents the wavelength (in nm), and the vertical axis represents the intensity of each section (in terms of wavelength) of spectrum, with the intensity of the 455 nm section of the spectrum set as 1. As will be evident from FIG. 4, the light source 12 in this embodiment is weak in intensity in the spectrum range which is no more than 430 nm in wavelength. Moreover, in the spectrum range which is no more than 420 nm in wavelength, it is zero in intensity. That is, the light source 12 in this embodiment cannot emit such light that is no more than 420 nm in wavelength. Therefore, if a conventional method is used to calculate the spectral reflectance of an object, which corresponds to the portion of the light spectrum, which is no more than 430 nm in wavelength, the spectral colorimeter 10 reduces in accuracy. In comparison, in this embodiment, the spectral reflectance of the object, which corresponds to the portion of the spectrum, which is no more than 430 nm in wavelength, is estimated based on the spectral reflectance of the object, which corresponds to the portion of the spectrum, which is no less than 430 in wavelength, in order to improve the spectral colorimeter 10 in accuracy. The method in this embodiment for estimating the spectral reflectance of an object is also described later.

[Image Forming Apparatus]

Figure 5A:
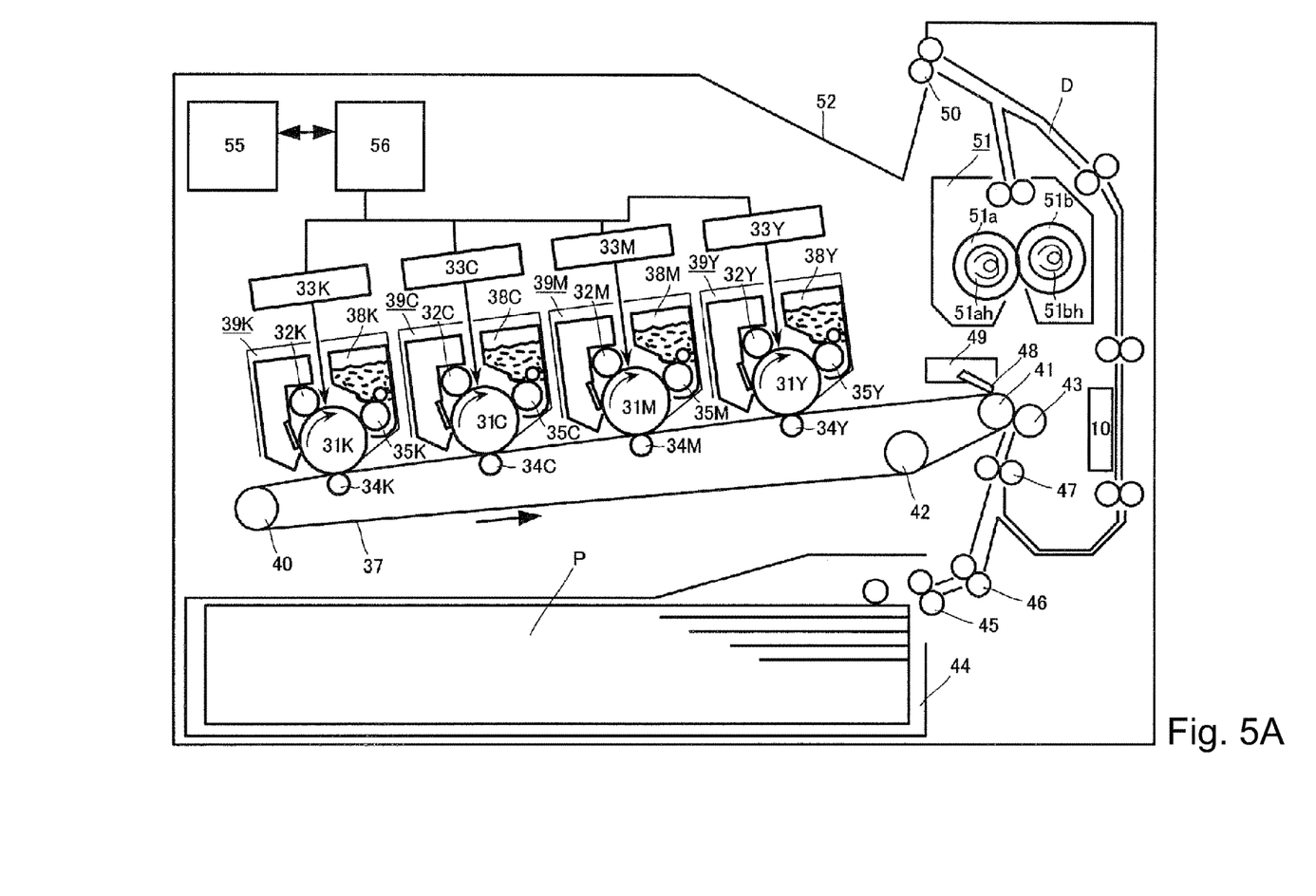
FIG. 5A is a sectional drawing of an image forming apparatus which has the spectral colorimeter, in the first and second embodiment.

The spectral colorimeter 10 in this embodiment is usable with an electrophotographic color image forming apparatus, for example. As an example of a case in which the spectral colorimeter 10 in this embodiment is employed by an electrophotographic image forming apparatus, a case in which the spectral colorimeter 10 in this embodiment is employed by a color image forming apparatus of the so-called tandem type, which uses an intermediary transfer belt is described. FIG. 5A is a schematic sectional view of an image forming apparatus which employs the spectral colorimeter 10 in this embodiment. It shows the general structure of the image forming apparatus. To begin with, the operation of the image forming section of the image forming apparatus in this embodiment is described. Here, the four image forming sections (image forming means) of the image forming apparatus are practically the same in structure and operation, although they are different in the color (yellow (Y), magenta (M), cyan (C) and black (K), one for one) of the toner they use. In the following description of the image forming sections, therefore, unless they need to be differentiated, the suffixes Y, M, C and K in FIG. 5A, which are for indicating the color component to which they are related are disregarded to describe the four image forming sections together.

The image forming apparatus in this embodiment has: four image forming sections: a recording medium feeding-conveying section 44; an intermediary transfer belt 37; a driver roller 41 for driving the intermediary transfer belt 37; a belt supporting roller 40; an auxiliary roller 42; a secondary transfer roller 43; and fixing section 51. Further, each of the four image forming sections has: a photosensitive drum 31 as an image bearing member; a charge roller 32 as a charging section; a scanner section 33; a developing device 38 as a developing section. Further, each image forming section has a primary transfer roller 34. Moreover, the image forming apparatus has: a combination of a controlling section 55 and a controller section 56 which controls the image forming operation of the image forming sections. The photosensitive drum 31 is made up of a piece of aluminum cylinder, and a photoconductive organic layer coated on the peripheral surface of the aluminum cylinder. It is rotated by the driving force transmitted thereto from an unshown motor, which rotates the photosensitive drum 31 in the direction (clockwise direction) indicated by an arrow mark in the drawing, during an image forming operation.

As the controlling section 55 receives an image formation signal (input signal), a sheet P of recording medium is fed into the sheet conveyance passage in the image forming apparatus, by a pair of sheet conveyance rollers 44 and a pair of sheet conveyance rollers 46, from a sheet feeding section 45 (cassette or the like). Thereafter, the sheet P is conveyed to a pair of registration roller 47 (which hereafter will be referred to simply as registration roller pair), which is for synchronizing the image forming operation (which is described later) and the conveyance of the sheet P. Then, the sheet P is temporarily kept on standby by the registration pair 47 (remains pinched by registration pair). Meanwhile, the controller section 56 makes the scanner section 33 form an electrostatic latent image, which is in accordance with the received image formation signals, on the peripheral surface of the photosensitive drum 31, which the controller section 56 made the charge roller 32 charge to a preset potential level.

The developing device 38 is a means for making the electrostatic latent image formed on the peripheral surface of the photosensitive drum 31, into a visible image. The four developing devices 38 of the four image formation stations develop the electrostatic latent image with the use of yellow (Y), magenta (M), cyan (C) and black (K) toners, one for one. Each developing device 38 is provided with a sleeve 35, to which development voltage for developing an electrostatic latent image into a visible image is applied. As described above, the electrostatic latent image formed on the peripheral surface of each photosensitive drum 31 is developed into a monochromatic toner image by the function of the corresponding developing device 38. The photosensitive drum 31, charge roller 32, and developing device 38 are integrated in the form of a toner cartridge 39, which is removably installable in the main assembly of the image forming apparatus.

The intermediary transfer belt 37 is disposed in contact with each of the four photosensitive drums 31. During an operation for forming a color image, it circularly moves in the direction indicated by an arrow mark in FIG. 5A, in synchronism with the rotation of each photosensitive drum 31. After electrostatic latent images on the photosensitive drums 31 are developed into monochromatic toner images, on the photosensitive drums 31, one for one, the monochromatic toner images are sequentially transferred (primary transfer) in layers onto the intermediary transfer belt 37 by the function of the primary transfer voltage applied to the primary transfer roller 34. Consequently, a multicolor tone image is effected on the intermediary transfer belt 37. Then, the multicolor toner image on the intermediary transfer belt 37 is conveyed to the secondary transferring section which is formed by the driver roller 41 and secondary transfer roller 43. As for the sheet P of recording medium, which has been kept on standby by the registration roller pair 47 while remaining pinched by the registration roller pair 47, it is conveyed to the secondary transferring section by the function of the registration roller pair 47, in synchronism with the movement of the multicolor toner image on the intermediary transfer belt 37. Then, the four monochromatic toner images, of which the multicolor toner image is made up, on the intermediary transfer belt 37 are transferred together (secondary transfer) onto the sheet P by the function of the secondary transfer voltage applied to the secondary transfer roller 43.

The fixing section 51 is for thermally fixing the transferred multicolor toner image to the sheet P of recording medium while conveying the sheet P. It has a fixation roller 51a for heating the sheet P, and a pressure roller 51b for pressing the sheet P upon the fixation roller 51a. The fixation roller 51a and pressure roller 51b are hollow. In the hollow of the fixation roller 51a and that of the pressure roller 51b, heaters 51a6 and 51bh are stored, respectively. The sheet P of recording medium, on which the multicolor toner image is borne is subjected to heat and pressure while it is conveyed by the fixation roller 51a and pressure roller 51b. Consequently, the toner is fixed to the surface of the sheet P.

After the fixation of toner image to the sheet P, the sheet P is discharged into a delivery tray 52 by a pair of discharge rollers 50, which concludes the image forming operation. However, in a case where the image forming apparatus is in the two-sided mode, the sheet P is sent back into the main assembly of the image forming apparatus, by the pair of discharge rollers 50, after being discharged halfway. More specifically, the sheet P, which is bearing the multicolor toner image on its first surface is sent back into the apparatus main assembly by the function of the pair of discharge roller 50, in order to form an image on the second surface of the sheet P. Then, the sheet P is sent back to the registration roller pair 47 by way of the sheet conveyance passage D for the two-sided mode. Then, it is temporarily kept on standby while remaining pinched by the registration roller pair 47. Thereafter, an image forming operation which is similar to the above-described one is carried out to form an image on the second surface of the sheet P. A cleaning device 48 which is a cleaning means is for removing the toner (transfer residual toner) which failed to be transferred onto the sheet P, and therefore, is remaining on the intermediary transfer belt 7. The toner recovered by the cleaning device 48 is stored in a waste toner container 49.

The spectral colorimeter 10 in this embodiment is disposed at the center of the sheet conveyance passage D for two-sided mode, in terms of the lengthwise direction of the passage D, for the purpose of measuring the color of the image of a referential color patch T (which is formed of toner and is described later), which is formed, as a test patch, on a sheet P of recording medium. Here, the lengthwise direction means the direction (parallel to rotational axis of photosensitive drum 3) perpendicular to the image formation surface of the sheet P which is being conveyed through the sheet conveyance passage D for two-sided mode. As for the lengthwise direction of the image forming apparatus, it is equivalent to the direction parallel to the axis X in FIG. 1, etc. In the case of the image forming apparatus in this embodiment, the controlling section 55 in the main assembly of the image forming apparatus adjusts each image forming section in image formation condition, based on the result of the measurement of the color of the patch T by the spectral colorimeter 10. The adjustment of the image forming section in image formation condition means compensating for image formation data, adjusting the image forming apparatus in the amount of exposure, development voltage, transfer voltage, etc.

[Operation for Measuring Color of Toner Patch]

Figure 5B:
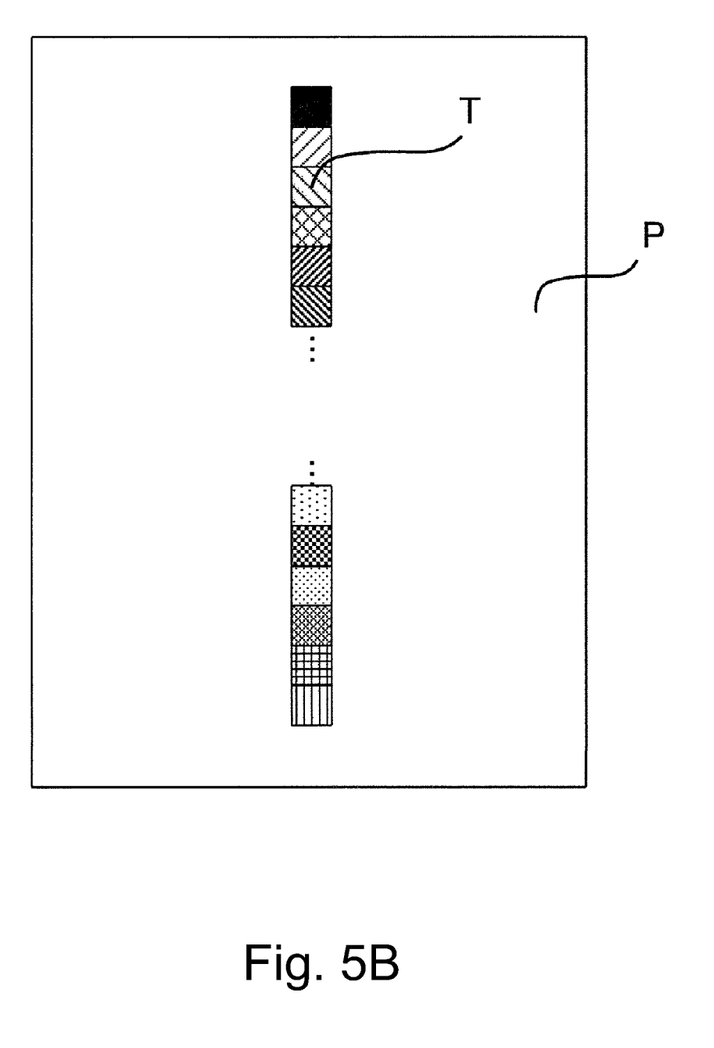
FIG. 5B is a drawing of a colorimetric referential patch.

Next, the operation for measuring the color of the toner patch with the use of the spectral colorimeter 10 is described. FIG. 5B is a schematic drawing of the patch T, or the image formed of toner, formed on a sheet P of recording medium to adjust the image forming apparatus in image formation condition. As an operation for measuring the color of a patch formed on the sheet P is started, an image such as the patch T shown in Figure (b) is formed on the sheet P through the above described image formation sequence. After the conveyance of the sheet P through the fixing section 51, the sheet P which is bearing the fixed patch, is pulled back into the sheet conveyance passage D for two-sided mode, by the reversely conveying operation of the pair of discharge rollers 50. Then, while it is conveyed through the passage D, the patch T on the sheet P is measured in color by the spectral colorimeter 10 disposed in the middle of the passage D; the cells of the patch T on the sheet P are sequentially measured in color in synchronism with the movement of the sheet P through the passage D. Then, after the sheet P is conveyed through the registration roller pair 47, it is conveyed through the secondary transferring section and fixing section 51, and then, is discharged into the delivery tray 52 by the pair of discharge rollers 50. The sequential steps in the above described image forming operation are controlled by the controlling section 55 in the image forming apparatus.

[Block Diagram of Image Forming Apparatus]

Figure 6:
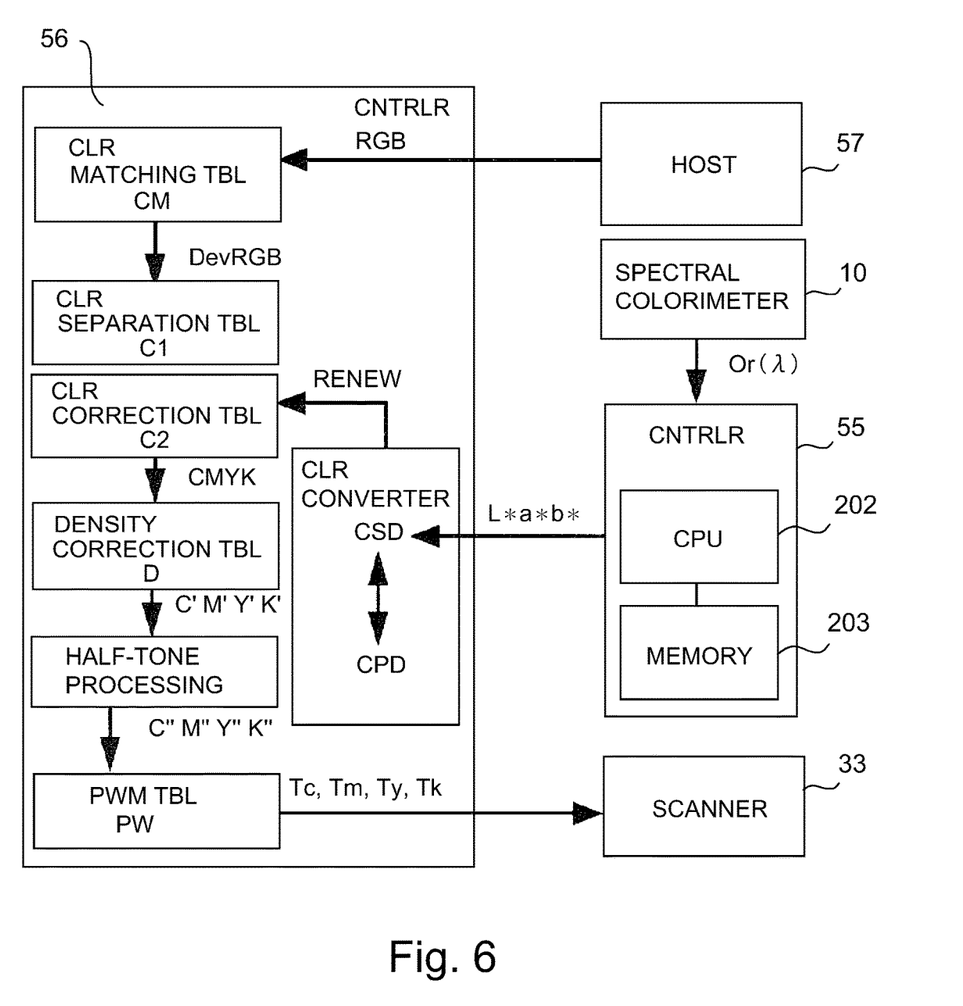
FIG. 6 is a block diagram of the image processing operation of the image forming apparatus in the first and second embodiments.

Next, referring to FIG. 6, an example of the image processing operation of the image forming apparatus in this embodiment is described. The controller section 56 and controlling section 55 of the image forming apparatus are in connection with each other through a video-interface. The controller section 56 is in connection to a peripheral device such as a host computer 57, or an unshown network. In the storage section of the controller section 56, a color matching table (CM), a color separation table (C1), and a color correction table (C2) are stored. Further, the controlling section 55 is provided with a CPU 202 which carries out image formation processes, and processes the results of the color measurement sent from the spectral colorimeter 10, and a memory 203 which temporarily stores the results of the color measurement sent from the spectral colorimeter 10.

As an image forming operation is started, the following processes are carried out. That is, RGB signals which represent the color components of the image to be formed, and which are sent from the host computer, or the like are sent to the controller section 56. Then, the controller section 56 converts the RGB signals into the device RGB signals (which hereafter will be referred to as DevRGB signals) which match the color reproduction range of the image forming apparatus, with reference to the color matching table (CM) which has been prepared in advance. Then, the controller section 56 converts the DevRGB signals into CMYK signals which correspond to the color of the toners which the color image forming apparatus uses, with reference to the color separation table (C1), the color correction table (C2) which will be described later. Then, the controller section 56 converts the CMYK signals into C'M'Y'K' signals; it adjusts the CMYK signals in tone-density properties, with reference to the density adjustment table (D) for compensating for the characteristic toner-density properties of the color image forming apparatus. Then, the controller section 56 carries out a halftoning process, converting thereby the C', M', Y' and K' signals into C", M", C" and K" signals. Then, the controller section 56 converts the C", M", Y" and K" signals into signals Tc, Tm, Ty and Tk which correspond to the length of time the photosensitive drums 31 are to be exposed by the scanning sections 33C, 33M, 33Y and 33K, with reference to a PWM table. Here, "PWM" stands for Pulse Width Modulation. The controller section 56 forms an electrostatic latent image on the peripheral surface of each of the photosensitive drums 31C, 31M, 31Y and 31K by controlling the scanning sections 33 in response to the signals Tc, Tm, Ty and Tk, and then, carries out the rest of the above described image formation sequence.

As for the operation to be carried out by the spectral colorimeter 10 to measure the color of the patch T, the patch T is formed on a sheet P of recording medium, according to the color patch data (CPD) of the multiple CMYK format, which are stored in advance in the controller section 56. Then, the patch T on the sheet P is measured in color by the spectral colorimeter 10, and a spectral reflectance Or (λ) is calculated for each patch T. Then, the spectral reflectance Or (λ) is outputted from the computing section 21c to the controlling section 55. The data regarding the spectral reflectance Or (λ) calculated by the spectral colorimeter 10 are converted by the controlling section 55 into chromaticity values (CIE L*a*b*, for example), and sent to the color conversion section of the controller section 56. Then, in the color conversion section, the chromaticity values are converted into data of the CMYK format (CSD), the chromaticity of which is dependent upon the image forming apparatus, with the use of an unshown CMS color management system). Thereafter, in the color conversion section, the CMYK format data (CSD) obtained by the conversion are compared with the default color patch data (CPD), and a color correction table (C2) is generated to compensate for the difference.

These processes are carried out for all of the measured patches T. However, it is not mandatory that the image forming apparatus is provided with all the referential color images for all the color which are reproducible by the image forming apparatus. For example, a grey patch may be formed of two or more toners of primary color, and compensation may be made regarding grey, or a monochromatic patch having a target color among C, M, Y and K colors may be formed for color measurement. As far as the CMYK data for the referential color patches which are not formed on the sheet P of recording medium are concerned, all that is necessary is that the color correction tables (C2) for those colors are made by making adjustments to the date of the referential color images of the target color. The color correction tables (C2) created through the above-described processes are renewed and held by the controller section 56.

[Method for Calculating Spectral Reflectance]

Next, the method, in this embodiment, for calculating spectral reflectance is described. In this embodiment, the spectral reflectance of the test patch T, which corresponds to the portion of the visible spectrum of light, the wavelength of which is in a range of 380 nm-420 nm, and which the light source 12 cannot generate, is estimated based on the spectral reflectance of the test patch T, which corresponds to the portion of the visible spectrum of light, the wavelength of which is in a range of 440 nm-450 nm, and which the light source 12 can generate, and which can be accurately calculated. As described above, in a case where the color measurement object 14 is measured in color, the diffused light 16 is passed through the slit 22, is turned into a spectrum of visible light (color) by the refraction grating 18 (diffused light 16 is turned into focused continuum of spectral sections which are different in wavelength), and are caught (detected) by the cells of the line sensor 11. Here, each cell of the line sensor 11 is provided with a numerical address (n=1-134) (part (c) of FIG. 3). Further, "Oi(n)" stands for the output of the voltaic signal outputted by each cell. The numerical addresses n (n=1-134) of each cell of the line sensor 11 has been paired in advance with the wavelength λ, and is held in the memory (unshown) of the computing section 21c. Hereafter, the pairing of the numerical address n with wavelength λ will be referred to as quantization. This quantizing operation can be done with use of one of known methods, for example, with the use of a referential spectrum of light with a known wavelength, prior to the shipment of the line sensor 11.

As described above, the numerical address n of each cell of the line sensor 11 is paired with a specific wavelength λ. Thus, as a voltaic signal is outputted from each cell, a signal strength spectrum Oi(λ) which corresponds to the wavelength of the reflected light from the color measurement object 14. That is, it is possible to convert the signal strength spectrum Oi(n) outputted by each cell of the line sensor 11, into a signal strength spectrum Oi(λ) for a specific wavelength range. In this embodiment, during this conversion, computation is made to obtain spectral reflectance for every 10 nm of wavelength by interpolation. The reason why the spectral reflectance was obtained for every 10 nm of wavelength is that 10 nm is sufficient to accurately calculate the chromatic value (CIE L*a*b*, for example), in consideration of the capacity of the memory section (unshown) of the computing section 21, and computational load. By the way, the spectral reflectance may be adjusted for every 5 nm of wavelength.

The spectral reflectance $Or(\lambda)$ of the color measurement object 14 can be obtained with the use of the following equation (1):

$$Or(\lambda) = \{Oi(\lambda)/Wi(\lambda)\} \times Wr(\lambda) \quad (1)$$

430 nm ≤ λ ≤ 730 nm.

Here, $Wi(\lambda)$ stands for the signal strength spectrum which corresponds to the wavelength of the light which was emitted by the light source 12 toward a referential sample (which generally is white in color), the spectral reflectance of which is known (has been obtained in advance), and was reflected by the referential sample. $Wr(\lambda)$ stands for the spectral reflectance of the referential sample itself. By the way, in this embodiment, the spectral reflectance which corresponds to the portion of the visible spectrum of light which the light source 12 can generates, and the wavelength of which is in a range of 430 nm to 730 nm, is calculated with the use of equation (1).

Moreover, as described with reference to FIG. 4, the spectral reflectance of the test patch, which corresponds to the portion of the visible spectrum of light which the light source 12 cannot generate, that is, the visible spectrum of light which is 380 nm-730 nm in wavelength, is calculated (estimated) by obtaining a straight line which indicates the relationship between wavelength and spectral reflectance, from the spectral reflectance of the test patch, which corresponds to the visible spectrum of light which the light source 12 can generate, and is 430 nm to 730 nm in wavelength. Concretely, it is calculated with the use of the following equations (2) and (3):

$$\alpha = (Or(450) - Or(440))/10 \quad (2)$$

$$Or(\lambda) = \alpha \times (\lambda - 440) + Or(440) \quad (3)$$

380 nm ≤ λ ≤ 420 nm.

Thus, it is possible to calculate the spectral reflectance for every 10 nm of wavelength, across the entire range of the visible spectrum of light which is 380 nm-730 nm in wavelength.

[Comparative Method]

Next, in order to clarify the effects of this embodiment, a comparative method is described. In the case of the comparative method, the equation (1) was used to calculate even the spectral reflectance, which corresponds to the portion of the visible spectrum of light which is 380 nm-420 nm in wavelength, and which the light source 12 cannot generate.

In order to confirm the effects of this embodiment, an image (color test patch) of a referential color image T was formed on a sheet P of recording medium, and the color of the patch was measured with the use of the spectral colorimeter 10. Then, the results of the measurement with the use of the method in this embodiment were compared with those obtained with the use of the comparative method. Table 1 shows the results of the tests conducted to test the repetitive reproducibility of the referential image T used for the evaluation. As is evident from Table 1, in the tests, 15 yellow (Y) patches, 15 magenta (M) patches, and 15 cyan (C) patches, which are different in image formation data, are used. 15 yellow (magenta, cyan, and black) patches were given patch numbers (1-15). For example, No. 1 yellow (Y) and No. 1 magenta (M) patch are zero. No. 1 cyan patch was 100. Further, No. 4 yellow (Y) patch and No. 1 cyan (C) patch were zero, and No. 4 cyan patch was 100.

These color test patches T which are different (15) in color were measured in color with the use of the spectral colorimeter 10. The repetitive color reproducibility was evaluated in the following manner. That is, first, 15 yellow (Y) patches were measured 100 times with the use of the spectral colorimeter 10, and the spectral reflectance for each patch T was calculated by the computing section 21c with the use of the method in this embodiment, and the comparative method. Then, the spectral reflectance calculated by the computing section 21c was used to obtain the average value of the chromaticity value CIE L*a*b*) by the controlling section 55. Then, the difference ΔE (CIE 1994) between the calculated average value and L*a*b* was calculated. Then, the standard deviation of color deviations ΔE obtained by the above described 100 times of measurement. Then, the obtained standard deviation of color deviation ΔE was defined as the color reproducibility of 15 patches.

The values in a row Ave, or the second raw from the bottom, in Table 1, are average of the standard deviations of color deviation ΔE, which was obtained as a referential value. The values in a row Max, or the first row from the bottom, are the largest standard deviation value of the color deviation ΔE.

TABLE 1

| Patch No. | Yellow | Magenta | Cyan | EMB. 1 | Comp. 1 |
|---|---|---|---|---|---|
| 1 | 0 | 0 | 100 | 0.13 | 0.19 |
| 2 | 0 | 100 | 0 | 0.15 | 0.21 |
| 3 | 100 | 0 | 0 | 0.10 | 0.11 |
| 4 | 0 | 100 | 100 | 0.14 | 0.16 |
| 5 | 100 | 0 | 100 | 0.19 | 0.29 |
| 6 | 100 | 100 | 0 | 0.51 | 0.62 |
| 7 | 0 | 70 | 70 | 0.12 | 0.16 |
| 8 | 70 | 0 | 70 | 0.17 | 0.23 |
| 9 | 70 | 70 | 0 | 0.27 | 0.35 |
| 10 | 0 | 40 | 40 | 0.10 | 0.14 |
| 11 | 40 | 0 | 40 | 0.13 | 0.18 |
| 12 | 40 | 40 | 0 | 0.14 | 0.22 |
| 13 | 0 | 20 | 20 | 0.09 | 0.14 |
| 14 | 20 | 0 | 20 | 0.12 | 0.19 |
| 15 | 20 | 20 | 0 | 0.14 | 0.21 |
| | | | Ave | 0.17 | 0.23 |
| | | | Max | 0.51 | 0.62 |

Referring to Table 1, the leftmost column contains the numerical designation of the color test patches T, and the second, third, and fourth column contain the image formation data for the yellow, magenta and cyan patches T. The fifth column from the left contains standard deviations of color deviation for this embodiment, and the last column, or the rightmost one, contains standard deviations of color deviation for the comparative method. As is evident from Table 1, the method in this embodiment is smaller in the standard deviation of color deviation ΔE than the comparative method. For example, in the case of a patch No. 1, the standard deviation of color deviations ΔE is 0.19 for the comparative method, whereas it is 0.13 for this embodiment, being smaller than that for the comparative method. That is, it was confirmed that the image forming apparatus was improved in repetitive color reproducibility with the use of the method in this embodiment for estimating the spectral reflectance.

As described above, according to this embodiment, the image forming apparatus (spectral colorimeter 10) was configured so that the spectral reflectance, which corresponds to the portion of the visual spectrum of the light, which is 380 nm-420 nm in wavelength, and which the light source 12 cannot generate is estimated based on the spectral reflectance, which corresponds to the visual spectrum of light, which is 440 nm-450 nm, and which the light source 12 can generate. Thus, the spectral colorimeter 10 is improved in color measurement accuracy. By the way, this embodiment was described with reference to a case in which the estimation of spectral reflectance, which corresponds to the shorter wavelength side of the visible ray. However, an estimation similar to the above described one can be made even in a case where a white LED, which cannot generate the portion of the visual spectrum of light, the wavelength of which belongs to the longer wavelength side of the spectrum, to improve a spectral colorimeter 10 in accuracy.

Generally speaking, in a case where a white LED is used as the light source for a spectral colorimeter, a white LED made up of a combination of a fluorescent member and a white LED, the wavelength of which is roughly 400 nm, or in the near-ultraviolet ray range, is used. Further, in order to stabilize a color printer in color reproducibility, a test image is formed on a sheet of recording paper, and the test image is measured in color. However, ordinary recording paper contains a fluorescent whitening agent for improving the recording paper in whiteness. A fluorescent whitening agent emits optical energy, the wave length of which is roughly 430 nm. Thus, the amount by which the portion of the visible spectrum of light, the wavelength of which is roughly 430 nm, is generated is affected by the amount by which the portion of the visible spectrum of light, the wavelength of which is in the range of near-ultraviolet ray, is generated by the white LED, and the ratio of the fluorescent whiting agent in recording sheet. Consequently, a spectral colorimeter 10 is reduced in accuracy. One of the methods for dealing this problem is to employ a UV filter to filter out ultraviolet ray to improve a spectral colorimeter 10 in accuracy. This method, however, possibly increases in cost, a spectral colorimeter, and an image forming apparatus equipped with a spectral colorimeter.

In comparison, in a case where a white LED made up of a combination of a blue LED, the wavelength of which is roughly 440 nm, and a fluorescent member, a UV filter is unnecessary, because the above described white LED does not emit ultraviolet ray. Therefore, it is possible to minimize the effects of the fluorescent whitening agent contained in recording paper. Moreover, since a blue LED, the wavelength of which is roughly 440 nm, is inexpensive due to its lower material cost, higher production volume, etc., and therefore, a white LED made up of a combination of the above described blue LED and a fluorescent member is inexpensive. However, in a case where a white LED made up of a combination of the above described blue LED and a fluorescent member is employed, virtually the portion of the visual spectrum of light, which is no more than 420 nm in wavelength is not emitted. Even in such a case, this embodiment makes it possible to accurately estimate the spectral reflectance, which corresponds to the portion of the visible spectrum of light, which is no more than 420 nm in wavelength.

By the way, this embodiment was described with reference to a light source, which cannot emit such a portion of the visible spectrum of light that is no more than 420 nm in wavelength. However, this embodiment is not intended to limit the present invention in terms of light source. For example, some types of light source are weak (not zero) in intensity across a certain wavelength range. Thus, using one of such types of light source as the light source for a spectral colorimeter reduces the spectral colorimeter in accuracy. Even in a case where a light source, the intensity of which is no more than a preset level across a certain range of its spectrum, is used as the light source for a spectral colorimeter, the spectral colorimeter can be improved in accuracy by estimating the spectral reflectance with the use of a method similar to the above described method.

Also in this embodiment, the method for controlling the spectral colorimeter with the use of the controlling section 55 of the image forming apparatus, and the computing section 21c of the spectral colorimeter 10 were described. However, this embodiment is not intended to limit the present invention in scope in terms of how the spectral colorimeter is controlled by the controlling section 55 of the image forming apparatus and the computing section 21c of the spectral colorimeter 10. For example, the operation of the spectral colorimeter 10 can be controlled by the controlling section 55, as a controlling means, of the image forming apparatus. In a case where only a single CPU 20 is employed as a controlling means, the spectral colorimeter 10 does not need to be equipped with the computing section 21c.

Further, the method, in this embodiment, for estimating the spectral reflectance, can be carried out by the spectral colorimeter 10 alone, that is, independently from the main assembly of the image forming apparatus. In this embodiment, the spectral colorimeter 10 was disposed within the image forming apparatus 100. However, even in a case where the spectral colorimeter 10 as a spectroscopic color measuring device is independent from the image forming apparatus 100, the above described estimating method can be used.

As described above, according to this embodiment, it is possible to improve a colorimeter in accuracy.

Embodiment 2

Next, the second embodiment of the present invention is described. By the way, the structural components of the image forming apparatus and those of the spectral colorimeter 10 in this embodiment, which are similar to the counterparts in the first embodiment are given the same referential codes as those given to the counterparts, one for one, and are not described here. In this embodiment, the spectral reflectance of a color test patch, which corresponds to such a visible spectrum of light that is 380 nm-420 nm in wavelength, that is, such a spectrum of light that the light source 12 cannot generate, is estimated based on the spectral reflectance of the color test patch, which corresponds in such a spectrum of light that is no less than 430 nm in wavelength, and that the light source 21 can generate, and also, that is characteristic in the spectral reflectance of the toner. Here, the wavelength range, which is characteristic in the spectral reflectance of toner, is one of the following wavelength ranges (1)-(4). That is, (1) is a wavelength range in which light is absorbed at the spectral reflectance of toner (spectral reflectance is near zero); (2) is a wavelength range which is highest in reflectance; (3) is a wavelength range which is higher in reflectance than the other ranges; and (4) is a wavelength range which is lower in reflectance than the other ranges. In this embodiment, the spectral reflectance, which corresponds to the portion of the visible spectrum of light, which the light source 12 cannot generate is obtained based on the spectral reflectance, which corresponds to one of (1)-(4) ranges.

Figure 7:
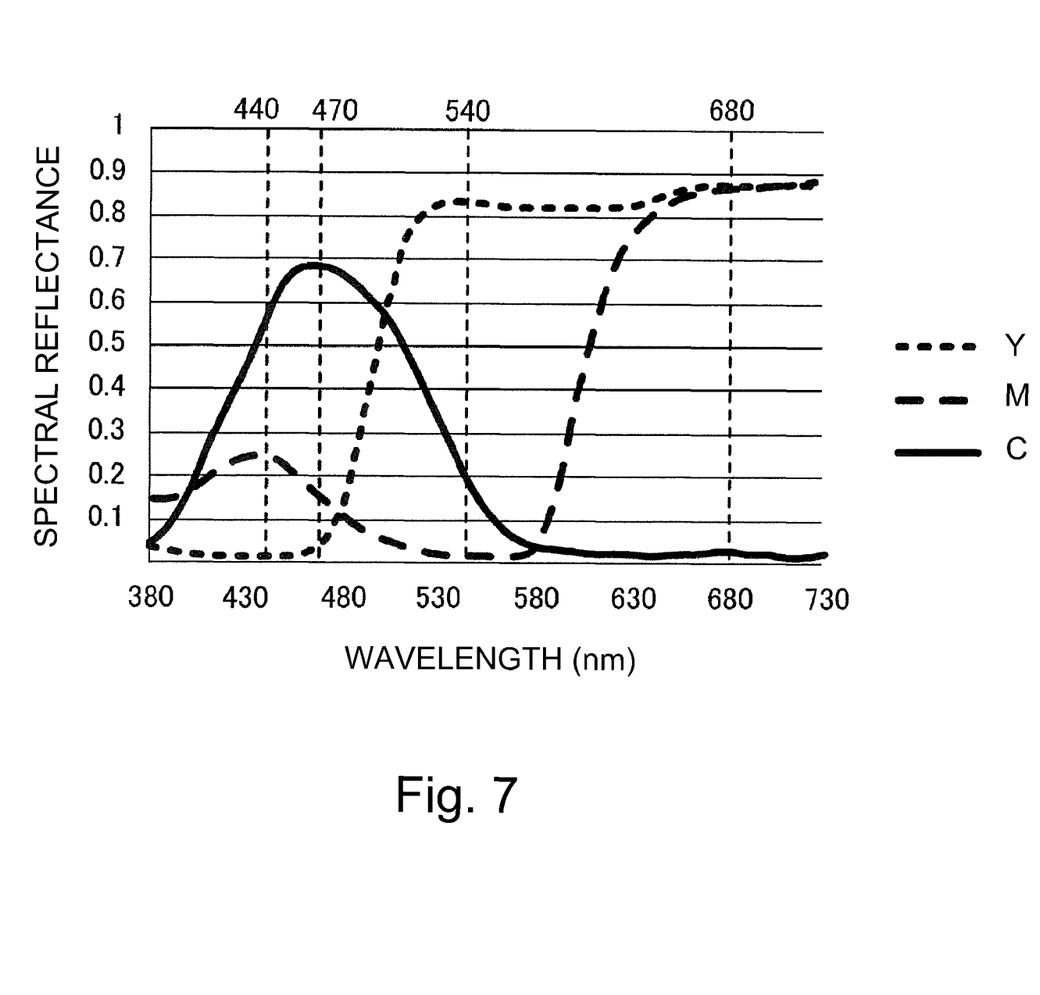
FIG. 7 is a drawing which shows the spectral reflectance of each of the toners used by the image forming apparatus in the second embodiment.

FIG. 7 shows the spectral reflectance of each of toners which are different in spectral reflectance. The horizontal axis represents wavelength (nm) and vertical axis represents the spectral reflectance of the toner, which corresponds to specific wavelength range of the light emitted by the light source 12. Referring to FIG. 7, the spectral reflectance of toner is affected by toner color, that is, the color of the toner material. The yellow toner, which is represented by a broken line with smaller intervals, is lowest in spectral reflectance where the wavelength is roughly 440 nm. That is, in the case of the yellow toner, where the wavelength is roughly 440 nm corresponds to (4). The magenta toner, which is represented by broken line with larger intervals in FIG. 7, is lowest in spectral reflectance where the wavelength is roughly 540 nm. That is, in the case of the magenta toner, where the wavelength is roughly 540 nm corresponds to the above described (4). The cyan toner, which is represented by a solid line in FIG. 7 is highest in spectral reflectance where the wavelength is roughly 470 nm. That is, in the case of the cyan toner, where the wavelength is in the adjacencies of 470 nm corresponds to the above described (2) or (3).

Further, where the wavelength is in the adjacencies of 680 nm, the yellow and magenta toners are high in spectral reflectance, whereas the cyan toner is low in spectral reflectance. That is, in the case of the yellow and magenta toners, where the wavelength is in the adjacencies of 680 nm corresponds to the above described (2) or (3). Further, in the case of the cyan toner, where the wavelength is in the adjacencies of 680 nm corresponds to the above described (4). Moreover, in the case of the yellow toner, where the wavelength is in the adjacencies of 440 nm corresponds to (1), and in the case of the magenta toner, where the wavelength is in the adjacencies of 560 nm corresponds to (4). Further, in the case of cyan toner, where the wavelength is in the adjacencies of 680 nm corresponds to (1). In this embodiment, therefore, the spectral reflectance of the toners, which corresponds to where the wavelengths are in the adjacencies of 440 nm, 470 nm, and 540 nm, respectively, which satisfy the above described conditions (1)-(4) are satisfied, are used. The spectral reflectances which correspond to these four wavelength ranges, are used to estimate the spectral reflectances of the toners, which correspond to such a spectrum of light that is 380 nm-420 nm in wavelength, which the light source 12 cannot generate.

[Method for Calculating Spectral Reflectance]

Next, the method, in this embodiment, for calculating the spectral reflectance is described. The spectral reflectance of the toner when the toner is illuminated with light, the wavelength of which is in a range of 430 nm~730 nm, and which the light source 12 can generate, is calculated with the use of the same method as the one used in the first embodiment. That is, the controlling section 55 of the image forming apparatus forms a color test patch T, which was described with reference to FIG. 5B, on a sheet P of recording paper. Then, it measures the color test patch T with the use of spectral colorimeter 10. More specifically, the computing section 21c of the spectral colorimeter 10 obtains the spectral reflectance, which corresponds to the wavelength of 430 nm-730 nm, with the use of above described equation (1). However, the computing section 21c of the spectral colorimeter 10 in this embodiment obtains the spectral reflectance $Or(\lambda)$ of each color test patch T, which corresponds to the wavelength range of 380 nm-420 nm, with the use of the following equations (4) and (5), and outputs the obtained spectral reflectance $Or(\lambda)$ to the controlling section 55:

$$\beta = A \times Or(440) + B \times Or(470) + C \times Or(540) + D \times Or(680) + E \quad (4)$$

$$Or(\lambda) = \beta \times (\lambda - 440) + Or(440) \quad (5)$$

380 nm ≤ λ ≤ 420 nm.

Here, A, B, C and D are coefficients, and are stored in advance in a memory (unshown). They are used by the computing section 21c when the computing section 21c calculates the spectral reflectance which corresponds to the wavelength of 380 nm-420 nm. In this embodiment, coefficients A, B, C and D are 0.0146, 0.0002, −0.0012, and −0.0006, respectively.

[Method for Calculating Coefficients A, B, C, and D]

Next, the method for calculating the coefficients A, B, C and D is described. First, 300 patches which are uniform in color space and different in color are formed by the color image forming apparatus. Then, 300 patches are measured in spectral reflectance. Then, a graph such as the one shown in FIG. 7 is created for each of the 300 patches. As the color measuring device to be used for measuring the 300 patches, the spectral colorimeter 10 used in this embodiment is not used. Instead, such a colorimeter that can meter the amount of visible light, and also, can precisely measure the spectral reflectance on the shorter wavelength side of the visible spectrum of light is used. As for the light source of the colorimeter, in order to suppress the effects of the fluorescent whitening agent of a sheet P of recording paper, it is desired that a white LED is not used. Instead, it is desired to use a tungsten lamp. Further, it is desired to filter out ultraviolet rays. In the experiment in which the method in this embodiment was compared with the comparative method which is described later, a colorimeter i1 (product of Xrite Co., Ltd) was used as the colorimeter along with a UV filter to measure the 300 patches.

After the 300 patches were measured in spectral reflectance with the use of a colorimeter which is different from the spectral colorimeter 10, the spectral reflectance of each of 300 patches, which corresponds to the wavelength range of 380 nm-420 nm were estimated by linear extrapolation. Then, the inclination of the inclination of the straight line used for the linear extrapolation obtained, based on the values obtained by actually measuring the 300 patches. Then, the correlation between the spectral reflectance at wavelengths of 440 nm, 470 nm, 540 nm and 680 nm and the straight line used to extrapolate the spectral reflectances which corresponds to the wavelength range of 380 nm to 420 nm was obtained by regression analysis to determine the values for the coefficients A, B, C and D.

[Comparative Method]

Then, in order to confirm the effects of the method this embodiment, the comparative method was evaluated in the same manner as the method in this embodiment. As the comparative method, even the spectral reflectance which corresponds to such a spectrum of light that is 380 nm-420 nm in wavelength, and the light source 12 cannot generate, was calculated with the use of the equation (1) presented in the description of the first embodiment.

TABLE 2

| Patch No. | Yellow | Magenta | Cyan | EMB. 2 | Comp. 1 |
| --- | --- | --- | --- | --- | --- |
| 1 | 0 | 0 | 100 | 0.12 | 0.19 |
| 2 | 0 | 100 | 0 | 0.13 | 0.21 |
| 3 | 100 | 0 | 0 | 0.08 | 0.11 |
| 4 | 0 | 100 | 100 | 0.12 | 0.16 |
| 5 | 100 | 0 | 100 | 0.16 | 0.29 |
| 6 | 100 | 100 | 0 | 0.40 | 0.62 |
| 7 | 0 | 70 | 70 | 0.11 | 0.16 |

TABLE 2-continued

| Patch No. | Yellow | Magenta | Cyan | EMB. 2 | Comp. 1 |
|---|---|---|---|---|---|
| 8 | 70 | 0 | 70 | 0.14 | 0.23 |
| 9 | 70 | 70 | 0 | 0.20 | 0.35 |
| 10 | 0 | 40 | 40 | 0.09 | 0.14 |
| 11 | 40 | 0 | 40 | 0.11 | 0.18 |
| 12 | 40 | 40 | 0 | 0.11 | 0.22 |
| 13 | 0 | 20 | 20 | 0.08 | 0.14 |
| 14 | 20 | 0 | 20 | 0.10 | 0.19 |
| 15 | 20 | 20 | 0 | 0.11 | 0.21 |
|  |  |  | Ave | 0.14 | 0.23 |
|  |  |  | Max | 0.40 | 0.62 |

Table 2 is similar to Table 1. It is evident from Table 2 that this embodiment is smaller in the standard deviation of the color deviations ΔE than the comparative method. That is, it is possible to confirm from Table 2 that the method in this embodiment is superior in repetitive color reproducibility to the comparative one.

Further, in comparison to the method in the first embodiment, this embodiment is superior in repetitive reproducibility in colorimetry. For example, comparing this embodiment with the first embodiment in terms of average value (Ave) of the standard deviation of the color deviation of all the patches, the standard deviation in Table 1 is 0.17, whereas the standard device in Table 2 which is related to this embodiment is 0.14. Thus, it is evident that the estimation by the method in this embodiment is preferable to that in the first embodiment, in terms of the improvement of the repetitive reproducibility in colorimetry.

As described above, according to this embodiment, the spectral colorimeter 10 in this embodiment is configured as follows to estimate the spectral reflectance of a color test patch, which corresponds to such a spectrum of light that is 380 nm-430 nm in wavelength, and that the light source 12 cannot generate. That is, the spectral reflectance of a color test patch is estimated with the use of the spectral reflectance of the color test patch, which is obtained by measuring the color test patch across the portion of color spectrum, which is no less than 430 nm in wavelength, can be generated by the light source 12, and is characteristic in spectral reflectance. Thus, this embodiment is higher in accuracy in colorimetry than the first embodiment.

As described above, according to this embodiment, it is possible to improve a colorimeter in accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-163743 filed on Aug. 11, 2014, which is hereby incorporated by reference herein in its entirety.

What is claimed is:

1. A color measurement device, comprising:
    a light emitting portion configured to illuminate an object with light;
    a dispersing portion configured to spectrally disperse light emitted and reflected by the object;
    a light receiving portion including a plurality of elements configured to receive the light spectrally dispersed by said dispersing portion; and
    a controller configured to effect color measurement on the basis of a result of light reception of said light receiving portion from the object which is an image formed on a recording material;
    wherein the light emitted by said light emitting portion has a first intensity of light in a first wavelength range and a second intensity lower than the first intensity in a second wavelength range,
    wherein said controller deduces a value relating to color measurement for the second wavelength range on the basis of a result of light reception of said light receiving portion for the first wavelength range,
    wherein said controller determines a spectral reflectance for the first wavelength range on the basis of the result of light reception of said light receiving portion for the first wavelength range, and
    wherein said controller deduces the spectral reflectance in the second wavelength on the basis of the spectral reflectance determined in the first wavelength range for one of a wavelength range where the light is absorbed with a spectral reflectance of a coloring material of the image, a wavelength range where the reflectance is maximum, a wavelength range where the reflectance is higher than in another wavelength range, and a wavelength range where the reflectance is lower than in another wavelength range.

2. A device according to claim 1, wherein the second light intensity is zero.

3. A device according to claim 1, wherein the image is monochromatic or multicolored by mixture of multi-colors.

4. A device according to claim 1, further comprising a reference member providing a reference for the color measurement, wherein said controller determines a spectral reflectance for the first wavelength on the basis of the result of light reception of said light receiving portion from the image for the first wavelength range a result of light reception of said light receiving portion from the reference member.

5. A device according to claim 1, wherein the light emitted by said light emitting portion has a third intensity higher than the second intensity in a third wavelength range, and
    wherein said controller determines a line indicative of a relation between spectral reflectance in the first wavelength range and the third wavelength range, and the spectral reflectance in the second wavelength range is deduced by extrapolation of the line.

6. A device according to claim 1, wherein a wavelength of the second wavelength range is smaller than that of visible light and/or is larger than that of visible light.

7. A device according to claim 6, wherein the second wavelength range ranges from 380 nm to 420 nm.

8. A device according to claim 1, wherein the first wavelength range ranges from 430 nm to 730 nm.

9. An image forming apparatus for forming an image on a recording material, said image forming apparatus comprising:
    an image forming portion configured to form the image on the recording material; and
    a color measurement device including,
    a light emitting portion configured to illuminate an object with light,
    a dispersing portion configured to spectrally disperse light emitted and reflected by the object,
    a light receiving portion including a plurality of elements configured to receive the light spectrally dispersed by said dispersing portion, and
    a controller configured to effect color measurement on the basis of a result of light reception of said light receiving portion from the object which is the image formed on the recording material, wherein the light emitted by said light emitting portion has a first intensity of light in a first wavelength range and a second intensity lower than the first intensity in a second wavelength range, wherein said controller deduces a value relating to color measurement for the second wavelength range on the basis of a result of light reception of said light receiving portion for the first wavelength range, wherein said controller determines a spectral reflectance for the first wavelength range on the basis of the result of light reception of said light receiving portion for the first wavelength range, and wherein said controller deduces the spectral reflectance in the second wavelength on the basis of the spectral reflectance determined in the first wavelength range for one of a wavelength range where the light is absorbed with a spectral reflectance of a coloring material of the image, a wavelength range where the reflectance is maximum, a wavelength range where the reflectance is higher than in another wavelength range, and a wavelength range where the reflectance is lower than in another wavelength range.

10. An apparatus according to claim 9, wherein the second light intensity is zero.

11. An apparatus according to claim 9, wherein the image is monochromatic or multicolored by mixture of multi-colors.

12. An apparatus according to claim 9, further comprising a reference member providing a reference for the color measurement, wherein said controller determines a spectral reflectance for the first wavelength on the basis of the result of light reception of said light receiving portion from the image for the first wavelength range a result of light reception of said light receiving portion from the reference member.

13. An apparatus according to claim 9, wherein the light emitted by said light emitting portion has a third intensity higher than the second intensity in a third wavelength range, and wherein said controller determines a line indicative of a relation between spectral reflectance in the first wavelength range and the third wavelength range, and the spectral reflectance in the second wavelength range is deduced by extrapolation of the line.

14. An apparatus according to claim 9, wherein a wavelength of the second wavelength range is smaller than that of visible light and/or is larger than that of visible light.

15. An apparatus according to claim 14, wherein the second wavelength range ranges from 380 nm to 420 nm.

16. An apparatus according to claim 9, wherein the first wavelength range ranges from 430 nm to 730 nm.

17. An apparatus according to claim 16, wherein an image formed on the recording material by said image forming station is subjected to color measurement by said color measurement device, and on the basis of a result of the color measurement, an image forming condition is adjusted.

18. A color measurement method for a color measurement device, wherein the color measurement device includes a light emitting portion configured to illuminate an object with light, a dispersing portion configured to spectrally disperse light emitted and reflected by the object, and a light receiving portion including a plurality of elements configured to receive the light spectrally dispersed by said dispersing portion, wherein the light emitted by said light emitting portion has a first intensity of light in a first wavelength range and a second intensity lower than the first intensity in a second wavelength range, wherein said color measurement method comprises:

a color measurement step which is effected on the basis of a result of light reception of said light receiving portion from the object which is an image formed on a recording material; and a step of deducing a value relating to color measurement for the second wavelength range on the basis of a result of light reception of said light receiving portion for the first wavelength range, wherein a spectral reflectance for the first wavelength range is determined on the basis of the result of light reception of said light receiving portion for the first wavelength range, and wherein the spectral reflectance in the second wavelength is deduced on the basis of the spectral reflectance determined in the first wavelength range for one of a wavelength range where the light is absorbed with a spectral reflectance of a coloring material of the image, a wavelength range where the reflectance is maximum, a wavelength range where the reflectance is higher than in another wavelength range, and a wavelength range where the reflectance is lower than in another wavelength range.

19. A method according to claim 18, wherein the second light intensity is zero.

20. A method according to claim 18, wherein the image is monochromatic or multicolored by mixture of multi-colors.

21. A method according to claim 18, wherein said color measurement device includes a reference member providing a reference for the color measurement, wherein a spectral reflectance for the first wavelength is determined on the basis of the result of light reception of said light receiving portion from the image for the first wavelength range a result of light reception of said light receiving portion from the reference member.

22. A method according to claim 18, wherein the light emitted by said light emitting portion has a third intensity higher than the second intensity in a third wavelength range, and wherein a line is determined, the line being indicative of a relation between spectral reflectance in the first wavelength range and the third wavelength range, and wherein the spectral reflectance in the second wavelength range is deduced by extrapolation of the line.

23. A method according to claim 18, wherein a wavelength of the second wavelength range is smaller than that of visible light and/or is larger than that of visible light.

24. A method according to claim 23, wherein the second wavelength range ranges from 380 nm to 420 nm.

25. A method according to claim 18, wherein the first wavelength range ranges from 430 nm to 730 nm.

* * * * *